Dec. 17, 1963   H. G. HEINRICH   3,114,523
SPEED RETARDATION DEVICE
Filed Aug. 9, 1961
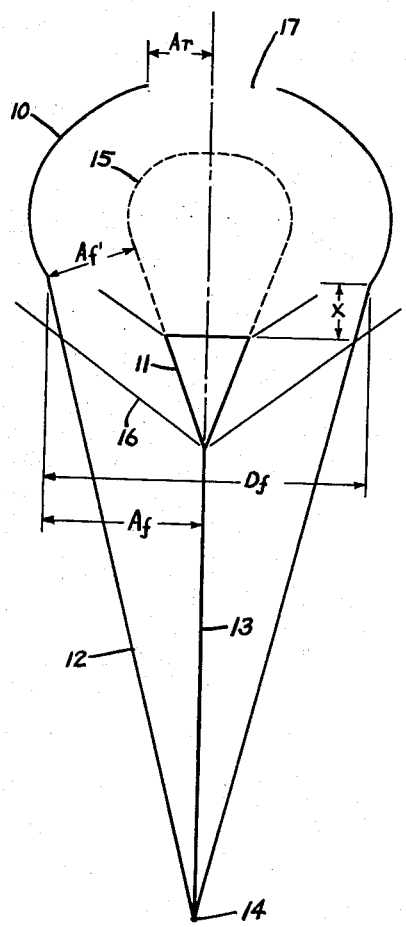
INVENTOR.
HELMUT G. HEINRICH
BY
*Moore, White & Durd*
ATTORNEYS 3,114,523
SPEED RETARDATION DEVICE
Helmut G. Heinrich, Minneapolis, Minn., assignor to Regents of the University of Minnesota, Minneapolis, Minn., a corporation of Minnesota
Filed Aug. 9, 1961, Ser. No. 130,379
8 Claims. (Cl. 244—113)

This invention relates to speed retardation devices, in the nature of parachutes. More particularly, this invention relates to retardation devices for use in reducing the rate of travel of objects moving at supersonic speeds.

It is known that the performance characteristics of convential parachutes are unsatisfactory at supersonic speeds. Investigation of the external flow field around the parachute has indicated the existence of a highly unstable bow shock and a general disorder of the air flow. In subsonic flow, the parachute canopy includes a large volume of air, the pressure of which is essentially constant within the canopy. Thus, there is no significant relative motion of air within the canopy nor is there any pronounced in and out flow. The same parachute in supersonic flow is not filled with relatively calm and homogeneous air, but, instead, there is a continuous in and out flow associated with moving pressure ridges which form a disorderly and unpredictable flow pattern. Under these circumstances, a flexible parachute canopy varies its shape in accordance with the state of pressure and flow. This motion represents the commonly known structural instability, "breathing" or "pumping."

It is the principal object of the present invention to provide a satisfactory supersonic retardation device without the observed deficiencies of conventional parachutes at supersonic speeds.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The present supersonic retardation device is based upon the new concept of converting the momentum of the air captured in the canopy of a parachute in a series of small pressure chambers by a certain amount of flow deflection and, fiinally, allowing the entire air mass to escape through a vent hole. By this means, the kinetic energy of the air captured in the parachute canopy at supersonic velocities is reduced to permit the air to be converted to a body of calm air with a steady and uniform pressure distribution.

The air inlet and outlet cross-sections of the retardation device according to the present invention are adjusted in such a manner that all air entering the device flows through in an orderly and controlled manner. The entire kinetic energy of the air mass is not utilized for retardation purposes, but, in view of the high energy level, enough retardation force may be developed to permit successful performance of the device in supersonic flow.

The speed retardation device of the present invention is shown schematically in profile in the drawing.

The speed retardation device includes a symmetrical canopy 10, forming a body of revolution, and a symmetrical right circular cone 11, the base of which is located some distance, X, ahead of the plane of the canopy inlet area. A plurality of shroud lines 12, uniformly spaced about the periphery of the canopy, and a tow line 13 attached to the apex of the cone extend to a connecting point 14 for attachment to the body whose rate of travel through space is to be retarded.

The canopy is flexible to permit it to be folded for packing in a small space and is desirably formed from strong woven or film sheet material such as nylon, "Mylar" or "Dacron" (Du Pont polyester materials). The cone, when in use, is rigid. It may be made to be collapsed when not in use. It is heat resistant and may be formed, for example, from steel and coated with a ceramic ablation material. The lines, for example, may be formed from ribbons or cables formed from nylon or "Dacron" filaments and desirably protected from aerodynamic heating by application of a chemical coating such as hexachloroethane or chloroanthraquinone. It is to be understood, however, that the present invention is directed to the structural configuration of the speed retardation device and is not limited by the use of any particular materials.

It has been determined experimentally that the stability of the flows which result in satisfactory performance characteristics at supersonic speeds are primarily affected by two variables which are the distance X from the base of the cone to the plane of the leading edge of the canopy and the ratio of the exit area of the canopy, $A_r$, to the effective inlet area, $A_f'$, $(A_r/A_f')$. A speed retardation device constructed within the limitations imposed by variables, when subjected to supersonic flow is statically stable and a steady flow pattern results. A large symmetrical wake or vortex region 15 is produced immediately behind the base of the cone. Relatively little mass transfer occurs between this region and the surrounding fluid, which moves much faster. A symmetrical bow shockwave, indicated schematically at 16, is attached to the cone and located upstream of the leading edge of the canopy. Since this shock wave does not touch the leading edge of the canopy, unsteady flow patterns and irregular flow velocities are avoided and the canopy remains statically stable. For each standoff distance of the cone, X, there exists a critical area ratio, $(A_r/A_f')_{cr}$, which has the significance that the system remains stable only when $A_r/A_f'$ exceeds this value. The critical area ratio varies approximately linearly with the ratio of cone distance X to frontal opening $D_f$, $(X/D_f)$.

The air, as it passes through the canopy is subjected to increasing pressure. The air in the zone at the air inlet between the leading edge of the canopy and the cone is at higher pressure than that in the zone immediately forward of the inlet area. The progressive zones between the canopy wall and vortex region increase in pressure to a peak adjacent the air escape area. The pressure then drops as the air escapes the canopy. The direction of air flow is changed. The momentum of the air is changed. The pressure level is changed.

It will be readily understood that the physical dimensions of the speed retardation device according to the present invention may vary widely depending upon the size and shape of the article or object whose rate of travel through space is desired to be retarded. Regardless of the actual physical dimensions of the speed retardation device, the relative proportions remain substantially constant within limits found to be operative. In general, at Mach No. 2 conditions the air exit area of the canopy, $A_r$, desirably ranges between about 0.3 to 1.5 times the effective inlet area, $A_f'$. At the same time, the standoff distance of the cone, X, varies between about 0.6 to 0.1 times the diameter of the frontal opening, $D_f$.

The air escape to air inlet area ratio varies inversely and approximately linearly with the ratio of cone standoff distance to frontal opening. Thus, if the cone standoff distance to frontal opening ratio is about 0.6 the air escape to effective air inlet area ratio should be about 0.3 and if the ratio of cone distance to frontal opening is about 0.1 the ratio of air escape area to air inlet area should be about 1.5. Since the ratios vary approximately linearly intermediate values can readily be determined.

In the illustrated embodiment the air exit area of the canopy is shown as a central aperture 17 in the top of the canopy. If the canopy is formed from a porous material that porosity must be considered in determining the total air exit area. Where the canopy is formed from a woven fabric, whatever openings may exist in the weaving between the threads of the fabric through which air may escape is taken into account. Instead of a single central air escape aperture the canopy may contain a plurality of uniformly spaced smaller apertures of comparable total area. As one example of this, the air escape openings from the canopy may take the form of a plurality of concentric generally annular apertures composed of a plurality of segments extending between ribs of the canopy and between concentric annular panels or ribbons of sheet material.

The effective air inlet area is measured between the leading edge of the canopy and the vortex region in the wake of the cone. The outer periphery of the forward end of the vortex region is virtually co-extensive with the slanting walls of the cone. For convenience the effective air inlet area is thus calculated by measuring the distance $A_f'$ along a line from the leading edge of the canopy and perpendicular to a reference line which is an extension of the slanting wall surface of the cone. The cone desirably has a half angle of between about 15 and 25 degrees and preferably about 20 degrees. The half angle of the cone is measured between the axis of the cone and the slanting wall. Although rigid, the cone is desirably hollow in order to minimize its weight. The trailing face may be either open or closed.

The following is exemplary of a typical speed retardation device constructed according to the present invention. The cone constructed of steel had a half angle of 20 degrees, measured units in length along the axis and had a base diameter of units. The canopy was constructed of nonporous sheet material. The total air escape area was a central aperture in the top of the canopy having a diameter of 3.2 units and escape area, $A_r$, of 8.03 square units. The frontal opening of the canopy had a diameter, $D_f$, of 3.6 units. The effective air inlet area, measured as the area between the leading edge of the canopy and the vortex region (assumed as an extension of the slanting walls of the cone), was 8.20 square units. The distance measured along the line $A_f'$ measured about 0.88 unit. The ratio of the exit area of the canopy to the effective inlet area thus was about 1.00. The cone was suspended so that the distance, X, between the base of the cone and the plane of the leading edge of the canopy was 1.18 units. Thus, the ratio of cone distance to frontal opening was 0.33. This structure was found to be statically stable when observed in wind tunnel tests while subjected to supersonic flow.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A speed retardation device for use under supersonic flow conditions comprising a canopy, shroud lines attached at spaced intervals around the periphery of said canopy and adapted to secure said canopy to an object whose speed is to be retarded, a rigid circular cone adapted to be suspended forward of the leading edge of said canopy in flight within and spaced from said shroud lines, a tow line attached to the nose of said cone and adapted to secure said cone to the object whose speed is to be retarded, said cone being centrally positioned with respect to said canopy along a common longitudinal axis, and means provided in the trailing surface of said canopy for the escape of large volumes of air therefrom.

2. A speed retardation means according to claim 1 further characterized in that the area of said air escape means ranges from about 0.3 to 1.5 times the effective air inlet area to said canopy between the leading edge of the canopy and the trailing edge of said cone.

3. A speed retardation device according to claim 1 further characterized in that said cone is adapted to be spaced forward of the leading edge of said canopy in flight by a distance equal to about 0.1 to 0.6 times the diameter of the frontal opening of said canopy.

4. A speed retardation device according to claim 1 further characterized in that said air escape means comprises at least one opening in the trailing surface of said canopy such that escape of air from said canopy in flight is distributed uniformly about the longitudinal axis of the speed retardation device.

5. A speed retardation device according to claim 4 further characterized in that said air escape means comprises a single central aperture in the trailing surface of said canopy.

6. A speed retardation device according to claim 1 further characterized in that said canopy, shroud lines, cone and tow line are constructed from a material which is resistant to aerodynamic heating.

7. A speed retardation device according to claim 6 further characterized in that said cone or parts thereof is hollow, formed from metal and provided with an exterior ceramic ablative coating.

8. A speed retardation device for use under supersonic flow conditions comprising a canopy, shroud lines attached at spaced intervals around the periphery of said canopy and adapted to secure said canopy to an object whose speed is to be retarded, a rigid circular cone adapted to be suspended forward of the leading edge of said canopy in flight within and spaced from said shroud lines, said cone being adapted to be spaced forward of the leading edge of said canopy in flight by a distance equal to about 0.1 to 0.6 times the diameter of the frontal opening of said canopy, a tow line attached to the nose of said cone and adapted to secure said cone to the object whose speed is to be retarded, said cone being centrally positioned with respect to said canopy along a common longitudinal axis, a central aperture in the trailing surface of said canopy for the escape of air from the canopy in flight, the area of said air escape aperture being from about 0.3 to 1.5 times the effective air inlet area to said canopy between the leading edge of the canopy and the trailing edge of said cone, said canopy, shroud lines, cone and tow line being resistant to aerodynamic heating.

References Cited in the file of this patent

UNITED STATES PATENTS

| | | |
|---|---|---|
| 1,649,934 | Thornblad et al. | Nov. 22, 1927 |
| 2,757,105 | Terry | July 31, 1956 |